United States Patent
Doh et al.

(10) Patent No.: US 6,684,033 B1
(45) Date of Patent: Jan. 27, 2004

(54) BIT RATE DETECTION CIRCUIT AND ALGORITHM FOR OPTICAL NETWORKS

(75) Inventors: Hee-Chan Doh, Suwon-shi (KR); Yun-Je Oh, Suwon-shi (KR); Tae-Sung Park, Suwon-shi (KR); Chan-Youl Kim, Bucheon-shi (KR); Gil-Young Park, Yongin-shi (KR)

(73) Assignee: Samsung Electronics Co., Ltd., Suwon (KR)

(*) Notice: Subject to any disclaimer, the term of this patent is extended or adjusted under 35 U.S.C. 154(b) by 603 days.

(21) Appl. No.: 09/702,033

(22) Filed: Oct. 30, 2000

(30) Foreign Application Priority Data

Sep. 5, 2000 (KR) .......................................... 2000-52342

(51) Int. Cl.[7] .............................................. H04B 10/06
(52) U.S. Cl. ......................... 398/202; 398/214; 398/27; 375/225; 375/327
(58) Field of Search ................................ 398/202, 214, 398/155, 27; 375/225, 327

(56) References Cited

U.S. PATENT DOCUMENTS 5,881,022 A * 3/1999 Morganstein ................ 368/46
2002/0027694 A1 * 3/2002 Kim et al. .................. 359/189
2003/0002108 A1 * 1/2003 Ames et al. ................. 359/152
2003/0016423 A1 * 1/2003 Cho et al. ................... 359/189
2003/0043440 A1 * 3/2003 Suzaki et al. ............... 359/189

OTHER PUBLICATIONS

Buchwald, Aaron; "Integrated Fiber–Optic Receivers"; 1:5–22;56–68; Aug. 26, 1994.

* cited by examiner

Primary Examiner—Kinfe-Michael Negash
(74) Attorney, Agent, or Firm—Cha & Reiter

(57) ABSTRACT

A receiver in an optical network with a bit rate detection circuit for automatically detecting input signal data bit rates to automatically adjust the frequency of a voltage controlled oscillator in the receiver is disclosed. The receiver has a data rate detection and frequency adjustment circuit which automatically detects the data rate of an input signal and automatically adjusts the frequency of the VCO in the receiver in accordance with the data rate of the input signal. The data rate detection and frequency adjustment circuit detects the data rate of the input signal by converting the input signal into a DC voltage value that varies with respect to the data rate of the input signal.

31 Claims, 9 Drawing Sheets

BIT RATE DETECTION CIRCUIT AND ALGORITHM FOR OPTICAL NETWORKS

BACKGROUND OF THE INVENTION

1. Field of the Invention

This invention relates generally to bit rate detection circuits for optical networks, and in particular, to methods and bit rate detection circuits for automatically detecting data bit rates to enhance end-to-end transparency and suppress jitters in optical networks.

2. Description of the Related Art

In a wavelength-division multiplexing (WDM) and erbium-doped fiber amplifier (EDFA) optical network system, jitters accumulate in the system as transmitted data pass through different modules in the system, and such accumulation of jitters affects the end-to-end transparency of the WDM system. As jitters accumulate in a system, the error rate in the system also increases, and a typical digital system may tolerate only $10_{-12}$ error rate. To suppress the jitters that occur in optical networks, optical networks typically employ clock and data recovery (CDR) circuits to extract and regenerate clock signals and retime the data by using the extracted clock signal.

FIG. 1 illustrates a prior art receiver 10 in an optical network for receiving transmitted data signals. The receiver 10 includes a photo diode 11, a low-noise amplifier 12, a limiting amplifier 13 and a CDR circuit 15. The photo diode 11 receives optical input data signals emanating from an optical fiber and converts the optical light energy in the input data signals into a low-level electrical current which can be used to produce electrical signals. The low-noise amplifier 12 receives the low-level signal current from the photo diode 11 and amplifies the signal so that additional processing will not add significantly to the noise in the signal. The low-noise amplifier 12 converts the low-level signal current into a voltage signal for subsequent processing. A transimpedance amplifier 20 shown in FIG. 2a may be used as the low-noise amplifier 12. In addition, the low-noise amplifier 12 reduces the bandwidth of the signal outputted by the photo diode 11. Basically, the low-noise amplifier 12 functions similar to a low pass filter except that the low-noise amplifier 12 has a much higher cutoff frequency than a typical low pass filter, e.g., 2.8 GHz.

The limiting amplifier 13 receives the output of the low-noise amplifier 12 and serves to buffer the receiver 10 from process variations and changes in signal strength. The limiting amplifier 13 also performs noise shaping. The limiting amplifier 13 contains either a limiter or an automatic-gain-control circuit to provide a proper signal level to the CDR 15, regardless of the output power of the low-noise amplifier 12. The limiting amplifier 13 outputs a constant-level output voltage, Vconst if the input voltage level is above a certain threshold value, Vth, as shown in FIG. 2b. Thus, even if the input signal has low amplitude and power, the limiting amplifier 13 will bring the input signal up to a proper amplitude and power level.

The CDR 15 recovers the timing information from the input data signal and samples the input data stream from the limiting amplifier 13 at an appropriate timing or instant. FIG. 2c illustrates a block diagram of a typical CDR 30 which may be used for the CDR 15. The CDR 30 uses a phase-lock loop (PLL) 31 to recover the clock from the input data signal. The CDR 30 includes an edge detector 35, a phase-lock loop (PLL) 31 and a decision circuit 36 which may be a D flip-flop. The PLL 31 includes a phase detector 32, a loop filter 33 and a voltage controlled oscillator (VCO) 34. The output of the PLL 31 is inputted into the decision circuit 36. In the CDR 30, the edge detector 35 first receives the input data signal, and then the input-data derived signal from the edge detector 35 is inputted into the phase detector 32 which functions as a mixer to heterodyne the edge-detected input signal down to the baseband. The phase detector 32 receives the input-data derived signal from the edge detector 35 and a clock signal outputted by the VCO 34 and produces a voltage proportional to the phase difference between the input-data derived signal from the edge detector 35 and the clock signal from the VCO 34. The output of the phase detector 32 is inputted into the loop filter 33, and the loop filter 33 outputs a control signal which controls the clock of the VCO 34. The above process is repeated until the phase difference is driven to zero (i.e., until the frequency or phase difference between the input data signal and the clock signal of the VCO 34 is near or at zero).

In other words, the PLL 31 basically tracks the phase of the edge detected signal by using the phase detector 32 to produce a phase-error signal, filters the phase-error signal with the loop filter 33 and adjusts the frequency of the VCO 34 by using the filtered signal so that the frequency of the VCO 34 is synchronized to the input data rate (i.e., the data rate or frequency of the input signal). The output of the VCO 34, which is the regenerated clock signal of the input data signal, is inputted into the decision circuit 36 which may be a D flip-flop so that the input data is sampled at a correct rate. In other words, assuming the decision circuit 36 is a D flip-flop, the output of the VCO 34 is inputted into the CK (clock) input of the D flip-flop so that the input data signal received by the D flip-flop is retimed or sampled at a correct frequency.

Although the prior art receiver 10 functions properly if the input data rate is fixed at a certain frequency such as 155 Mbps or 1.25 Gbps, the prior art receiver 10 will have problems processing the input data signal if the frequency of the input data signal (i.e., input data rate) varies over a wide range because the frequency of the VCO 34 needs to be set at a rate that approximately matches the frequency of the input data signal. For example, if the input data rate is 2.5 Gbps and the frequency of the VCO is set at 155 MHz, the receiver 10 will not be able to process the input data signal because the PLL 31 will not lock with the input signal since the frequency of the VCO is totally mismatched with the input signal data rate. A VCO having a clock frequency of 155 MHz will not be able to produce a clock signal having a frequency of 2.5 GHz. However, in today's communication systems, signal data rates vary over a wide range from 125 Mbps to 10 Gbps. Thus, if the prior art receiver 10 is used to receive input data signals that have widely varying frequency rates, the frequency of the VCO 34 needs to be manually changed every time to approximately match the input signal data rate if the frequency of the input signal changes dramatically, and such resetting of the VCO frequency can be a cumbersome process which may hinder the smooth operation of the receiver 10.

Therefore, there is a need for a receiver that automatically detects the frequency of the input data signal, adjusts the frequency of the VCO automatically with respect to the changes in the frequency of the input data signal, and retains the transparency of the input data while suppressing jitters.

SUMMARY OF THE INVENTION

It is an object of the present invention to provide a receiver in an optical network with a bit rate detection circuit for automatically detecting input signal data bit rates to automatically adjust the frequency of a voltage controlled oscillator in the receiver, which obviate for practical purposes the above mentioned limitations.

A receiver in accordance with an embodiment of the present invention has a data rate detection and frequency adjustment circuit which automatically detects the data rate of an input signal and automatically adjusts the frequency of a VCO in the receiver in accordance with the data rate of the input signal.

The receiver first receives an input signal through a photo diode. The photo diode outputs a low level current corresponding to the input signal, and a low noise amplifier converts the low level current into a voltage signal for subsequent processing. A limiting amplifier receives the output of the low-noise amplifier and serves to buffer the receiver from process variations and changes in signal strength. The limiting amplifier outputs a constant level voltage if the input voltage is above a certain threshold.

The data rate detection and frequency adjustment circuit receives the output of the limiting amplifier to determine the data rate of the input signal. A low pass filter first filters out high frequency components from the input signal, including white and thermal noises present in high frequencies. An AC power meter converts the output from the low pass filter into a DC voltage value which changes with respect to the data rate of the input signal. A logarithmic amplifier receives the DC voltage value and converts the DC voltage value to another DC voltage value such that the new DC voltage value is linear with respect to the changes in the data rate of the input signal. Thus, signals with different data rates produce different output DC voltages. A controller receives the output DC voltage from the logarithmic amplifier and determines the data rate of the input signal based on the value of the DC voltage. Since the value of the DC voltage outputted by the logarithmic amplifier varies with respect to the data rate of the input signal, the controller is able to accurately determine the data rate. After determining the data rate, the controller changes the frequency of the VCO to match the data rate of the input signal so that a clock and data recovery circuit in the receiver is able to properly process the input data signal.

Other features and advantages of the invention will become apparent from the following detailed description, taken in conjunction with the accompanying drawings which illustrate, by way of example, various features of embodiments of the invention.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 3:
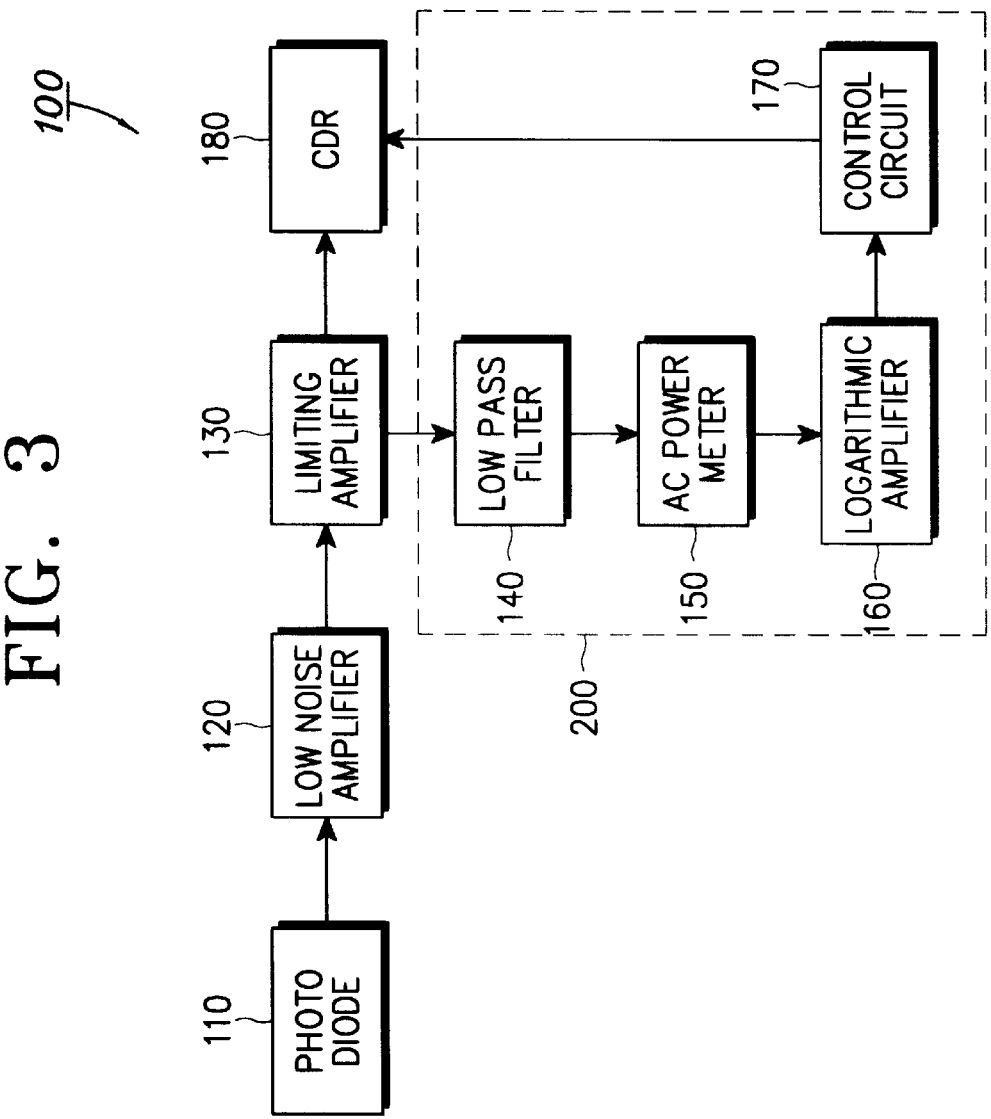
FIG. 3 is a block diagram of an optical network receiver in accordance with an embodiment of the present invention.

FIG. 3 illustrates a structure of an optical network receiver 100 in accordance with an embodiment of the present invention. The receiver 100 includes a photo diode 110, a low noise amplifier 120, a limiting amplifier 130, a data rate detection and frequency adjustment circuit 200 and a CDR 180. The data rate detection and frequency adjustment circuit 200 comprises a low pass filter 140, an AC power meter 150, a logarithmic amplifier 160, and a control circuit 170

The photo diode 110 receives optical input data signals emanating from an optical fiber and converts the optical light energy in the input data signals into a low-level electrical current which can be used to produce electrical signals. The low-noise amplifier 120 receives the low-level signal current from the photo diode 110 and amplifies the signal so that additional processing will not add significantly to the noise in the signal. The low-noise amplifier 120 converts the low-level signal current into a voltage signal for subsequent processing.

Figure 1:
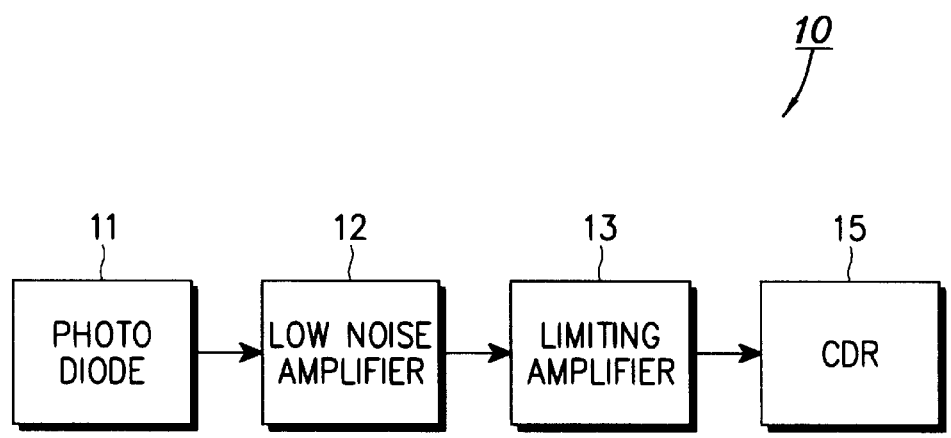
FIG. 1 is a block diagram of a prior art optical network receiver.
Figure 2A:
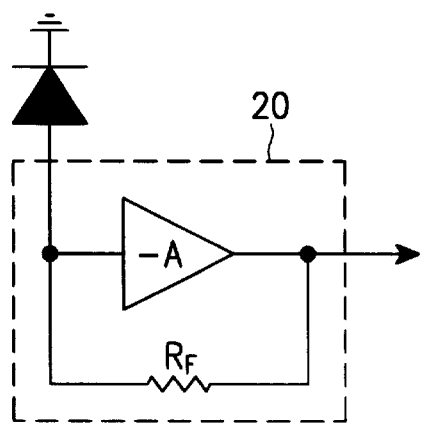
FIG. 2a is a schematic of a transimpedance amplifier.

A transimpedance amplifier 20 shown in FIG. 2a may be used as the low-noise amplifier 120. In addition, the low-noise amplifier 120 reduces the bandwidth of the signal outputted by the photo diode 110. Basically, the low-noise amplifier 120 functions similarly to a low pass filter except that the low-noise amplifier 120 has a much higher cutoff frequency than a typical low pass filter, as discussed above.

Figure 2B:
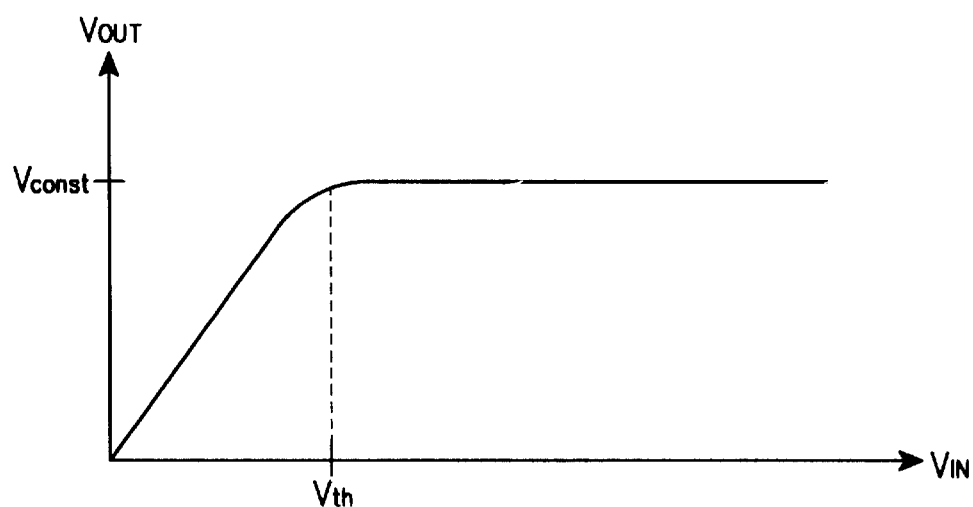
FIG. 2b shows the output signal of a limiting amplifier.
Figure 2C:
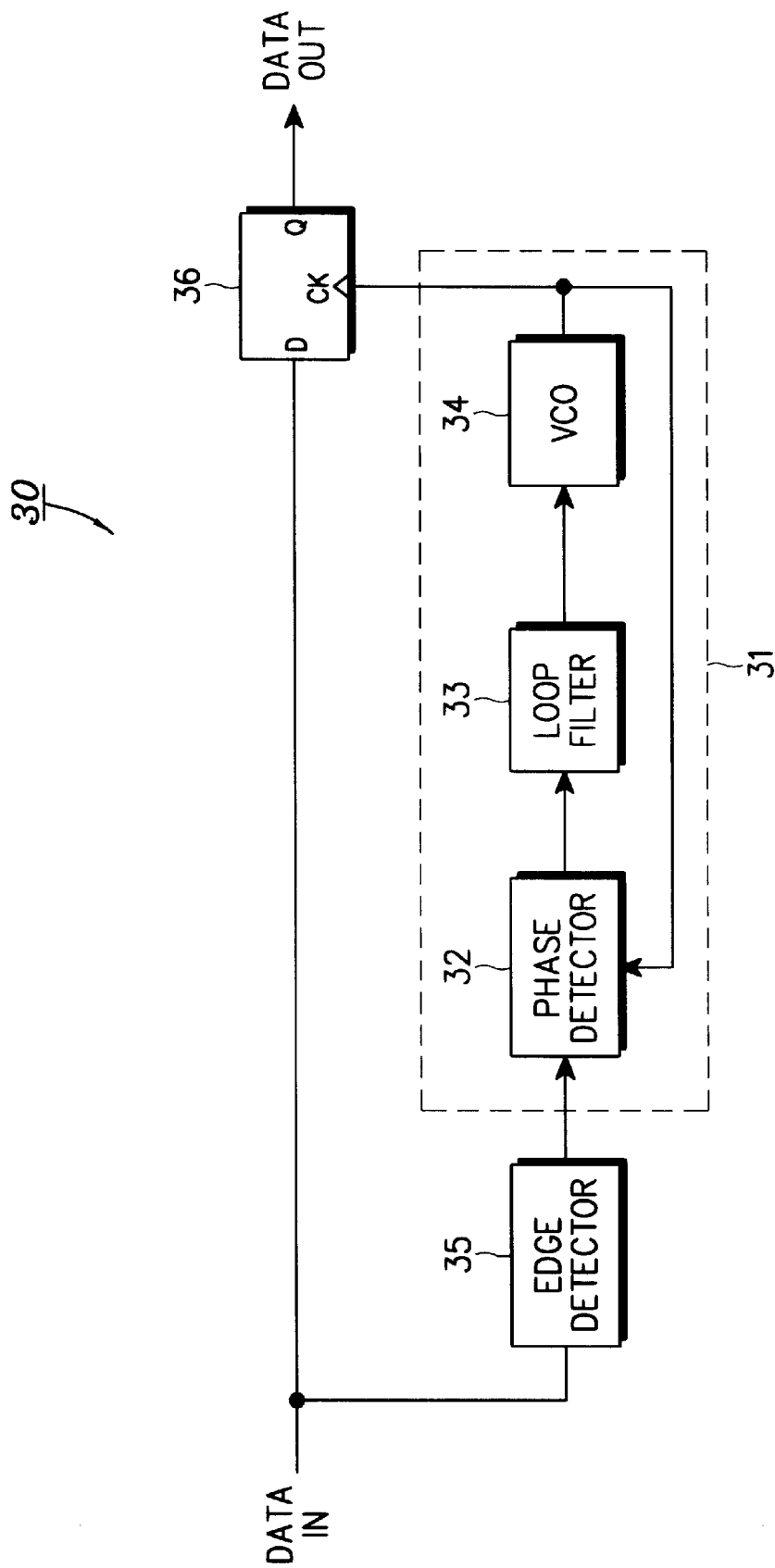
FIG. 2c is a block diagram of a clock and data recovery circuit.

The limiting amplifier 130 receives the output of the low-noise amplifier 120 and serves to buffer the receiver 100 from process variations and changes in signal strength. The limiting amplifier 130 also performs noise shaping. The limiting amplifier 130 contains either a limiter or an automatic-gain-control circuit to provide a proper signal level to the CDR 180 and the low pass filter 140, regardless of the output power of the low-noise amplifier 120. The limiting amplifier 130 outputs a constant level voltage (Vconst) if the input voltage level is above a certain threshold value (Vth), as shown in FIG. 2b.

Figure 4:
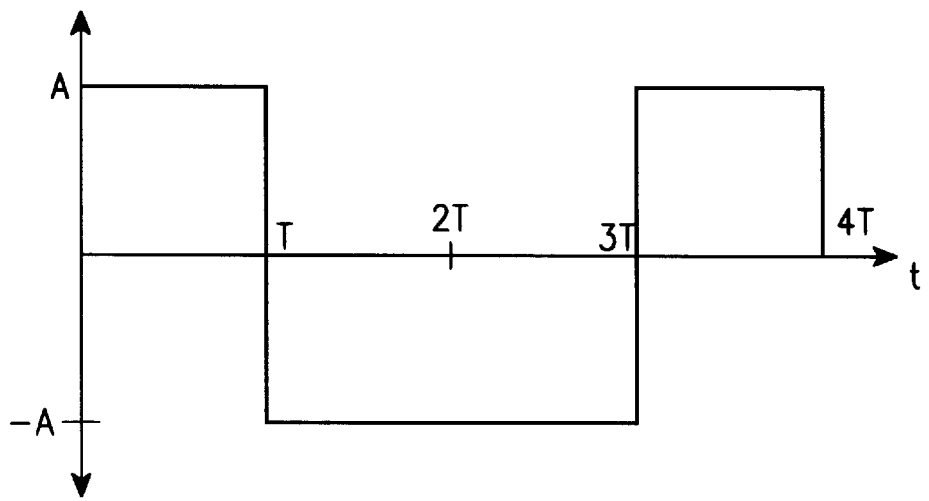
FIG. 4 shows an NRZ signal produced by a limiting amplifier.
Figure 4A:
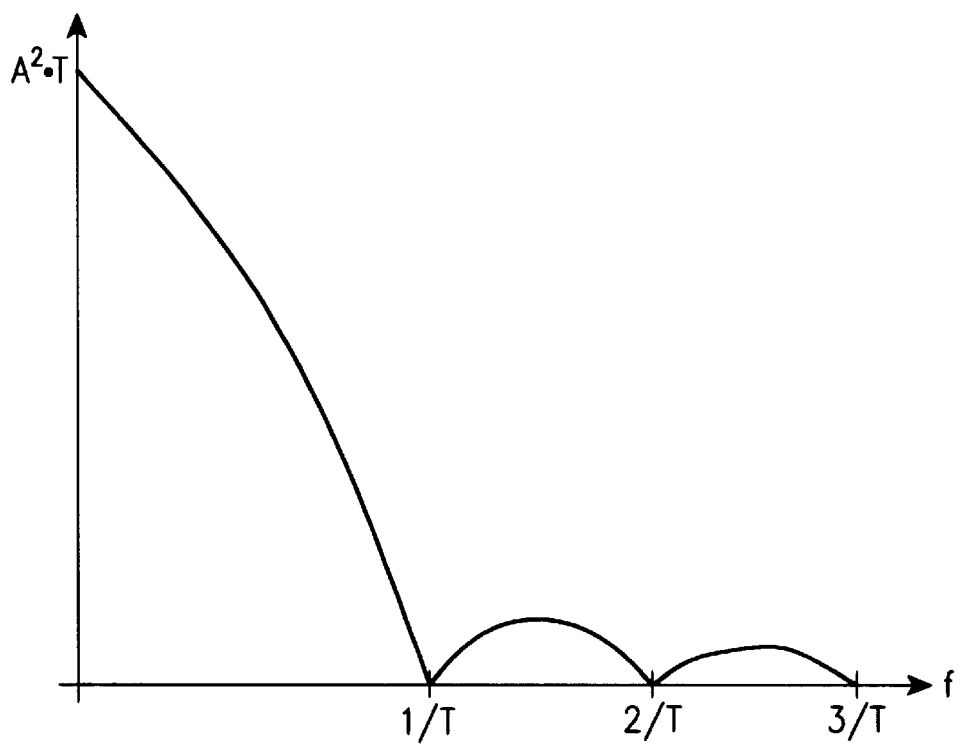
FIG. 4a illustrates a power spectral density of an NRZ signal.

In most of intensity modulation-direct detection (IM-DD) optical network systems, Non-Return to Zero (NRZ) format is used for the baseband signals. FIG. 4 shows an NRZ signal which may be produced by the limiting amplifier 130. The NRZ signal shown in FIG. 4 has an amplitude of 'A', a period of 'T', and a data rate of 'r'=1/T. All signals outputted by the limiting amplifier 130 has an amplitude of 'A' because the limiting amplifier 130 outputs a constant level voltage if the input voltage level is above a certain threshold value. FIG. 4a shows a power spectral density of an NRZ signal, which measures the power of the signal with respect to frequency. The power spectral density function for the NRZ signal is given by the following equation: $S(f)=A^2T\,\text{sinc}^2(fT)=(A^2/r)\,\text{sinc}^2(f/r)$. It is to be noted that in FIG. 4a the highest power level is $A^2T$, so if the frequency of an NRZ signal increases, the peak power level decreases proportionally since $r=1/T$. As shown in FIG. 4a, vast majority (approximately 99%) of the signal power is limited to frequencies under $1/T$. Thus, all signal components having frequencies higher than $1/T$ does not contribute significantly to the power of an NRZ signal.

The output of the limiting amplifier 130 is inputted into the low pass filter 140. The low pass filter 140 has a system function of h(t) which after fourier transform is equal to H(f) (i.e., F(h(t))=H(f)).

Let x(t)=the output of the limiting amplifier 130;

$R_Q(\tau)$=the auto correlation function of x(t);

$F(R_Q(\tau))=S(f)$=the power spectral density function of $x(t)=A^2T\,\text{sinc}^2(fT)$;

b(t)=the power spectral density function of the output of the low pass filter 140=s(t)*h(t); *=convolution;

$F(b(t))=B(f)=S(f)\times|H(f)|^2$. Thus, the power spectral density function of the output signal of the low pass filter 140 is equal to $S(f)\times|H(f)|^2$.

Figure 5A:
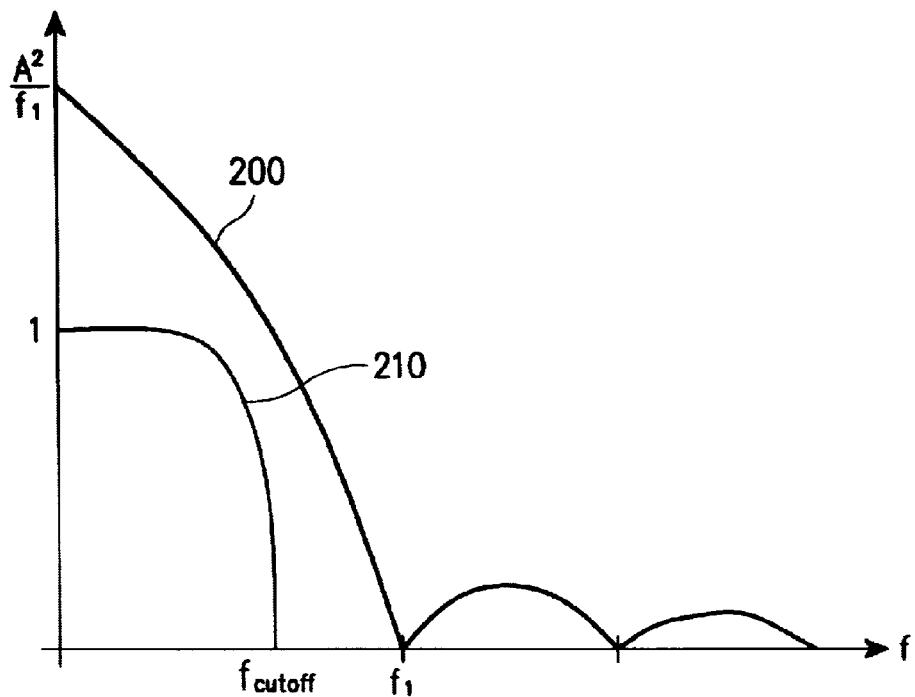
FIG. 5a illustrates a normalized power spectral density of a low pass filter and an output signal of a limiting amplifier in accordance with an embodiment of the present invention.
Figure 5B:
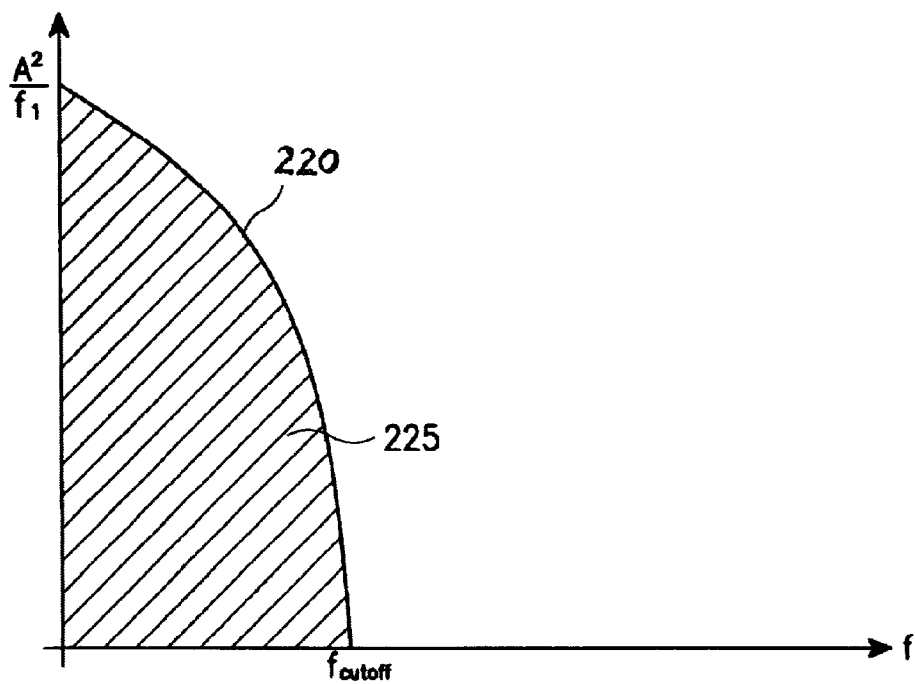
FIG. 5b illustrates a power spectral density of an output signal of the low pass filter in accordance with an embodiment of the present invention.

FIG. 5a shows a normalized power spectral density S1(f) of an output signal x1(t) of the limiting amplifier 130 and the system function H(f) of the low pass filter 140. A curve 200 represents the power spectral density S1(f) and a curve 210 represents H(f) which has a cutoff frequency of 'fcutoff'. The output signal x1(t) has a data rate of 'f1' (i.e., r=f1). The peak value of S1(f) is $A^2/f1$ and $A^2/f1>1$. When S1(f) passes through the low pass filter 140 with the system function of H(f), the low pass filter 140 outputs B1(f) which is equal to S1(f)×H(f) (i.e., B1(f) is a power spectral density function of the output signal of the low pass filter 140). FIG. 5b shows the power spectral density B1(f) represented by a curve 220. As shown by the curve 220, the low pass filter 140 filters out all frequency components above fcutoff from S1(f).

Figure 5C:
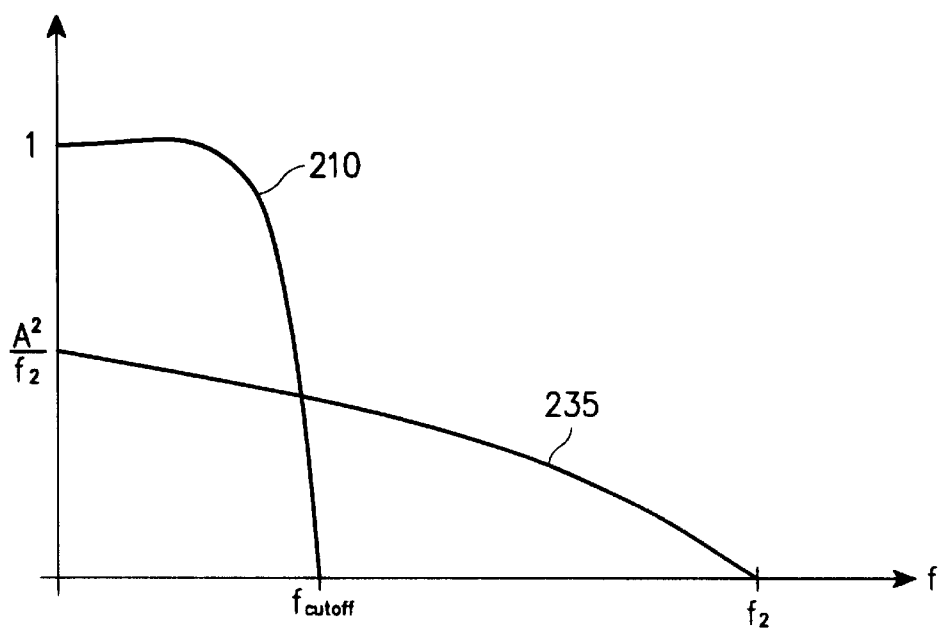
FIG. 5c illustrates a normalized power spectral density of the low pass filter and an output signal of a limiting amplifier in accordance with an embodiment of the present invention.
Figure 5D:
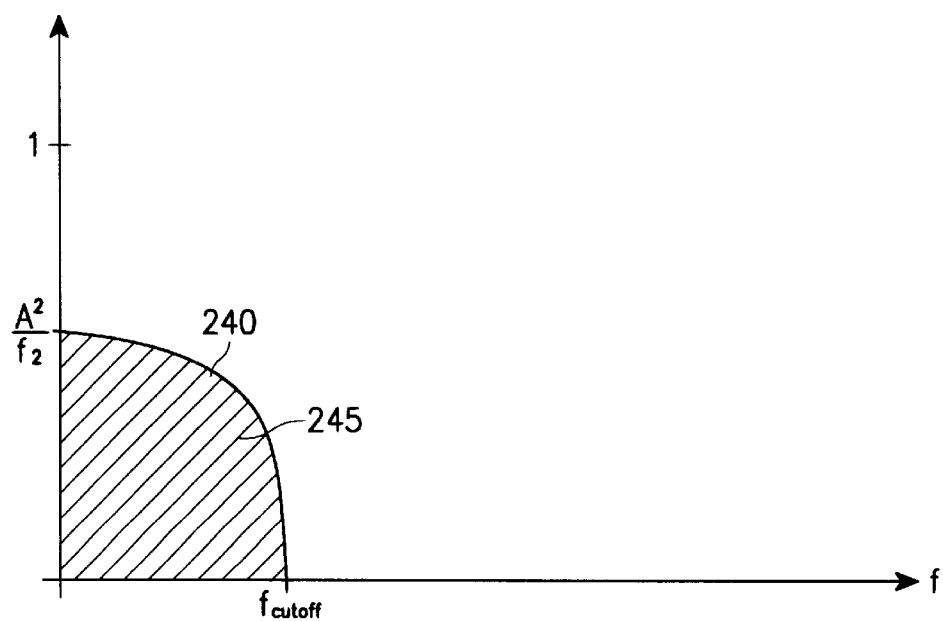
FIG. 5d illustrates a power spectral density of an output signal of the low pass filter in accordance with an embodiment of the present invention.

FIG. 5c shows a normalized power spectral density S2(f) of an output signal x2(t) of the limiting amplifier 130 and the system function H(f) of the low pass filter 140. x2(t) has a data rate of 'f2' (r=f2 and f2>>f1) and is represented by a curve 235. The peak value of S2(f) is $A^2/f2$ and $A^2/f2<1$. When S2(f) passes through the low pass filter 140 with the system function of H(f), the low pass filter 140 outputs B2(f) which is equal to S2(f)×H(f). FIG. 5d shows the power spectral density B2(f) represented by a curve 240. As shown by the curve 240, the low pass filter 140 filters out all frequency components above fcutoff from S2(f).

The AC power meter 150 receives the output signal of the low pass filter 140, and outputs a DC voltage that represents the total power present in the output signal of the low pass filter 140. The AC power meter 150 first performs the following function:

TOTAL_POWER(r)=the total power present in the output signal of the low pass filter $$140 = \int_0^{fcutoff} B(f)df =$$

$$\int_0^{fcutoff} S(f)df = \int_0^{fcutoff} \frac{A^2}{r}\text{sinc}^2\left(\frac{f}{r}\right)df = \frac{A^2}{r}\int_0^{fcutoff}\text{sinc}^2\left(\frac{f}{r}\right)df;$$

r=the input data rate.

TOTAL_POWER equals the area under the curve of B(f) which represents the total power of the output signal of the low pass filter 140. As shown by the equation above, TOTAL_POWER(r) decreases as the input data rate 'r' increases.

After calculating TOTAL_POWER, the AC power meter 150 then calculates a Vrms value which represents TOTAL_POWER and outputs a DC voltage value which represents the Vrms value. In certain embodiments of the present invention, the Vrms value and the output DC voltage are calculated by using the following equation:

$$\text{TOTAL\_POWER} = \frac{(Vrms)^2}{R};\quad R = 1\Omega,$$

then

Vrms=$\sqrt{\text{TOTAL\_POWER}}$ and the output DC voltage representing the Vrms value=Vrms.

Let ACOUT(r)=the DC voltage value which represents the Vrms value=the output of the AC power meter 150; r=the input data rate.

The value of ACOUT(r) depends on the data rate of the input signal as shown by Table 1 below. For example, as shown by FIGS. 5b and 5d, the area under the curve B1(f), represented by a shaded region 225, is greater than the area under the curve B2(f), represented by a shaded region 245, since $A^2/f1>A^2/f2$. Thus, the TOTAL_POWER for the input data rate of f1 is greater than the TOTAL_POWER for the input data rate of f2. As a result, ACOUT(f1) is greater than ACOUT(f2). In other words, the value of ACOUT(r) changes in accordance with the data rate of the input signal received by the receiver 100. Table 1 lists some exemplary values for ACOUT based on the input data rate.

TABLE 1

| Input Data Rate | ACOUT(r) |
| --- | --- |
| 125 Mbps | 1612 mV |
| 155 Mbps | 1346 mV |
| 200 Mbps | 1100 mV |
| 622 Mbps | 459 mV |
| 1200 Mbps | 276 mV |
| 2500 Mbps | 176 mV |

As shown by Table 1, the value of ACOUT decreases as the input data rate increases because TOTAL_POWER also decreases as the input data rate increases. Therefore, the data rate detection and frequency adjustment circuit 200 is able to detect the data rate of the input signal because ACOUT changes with respect to the data rate.

Figure 6:
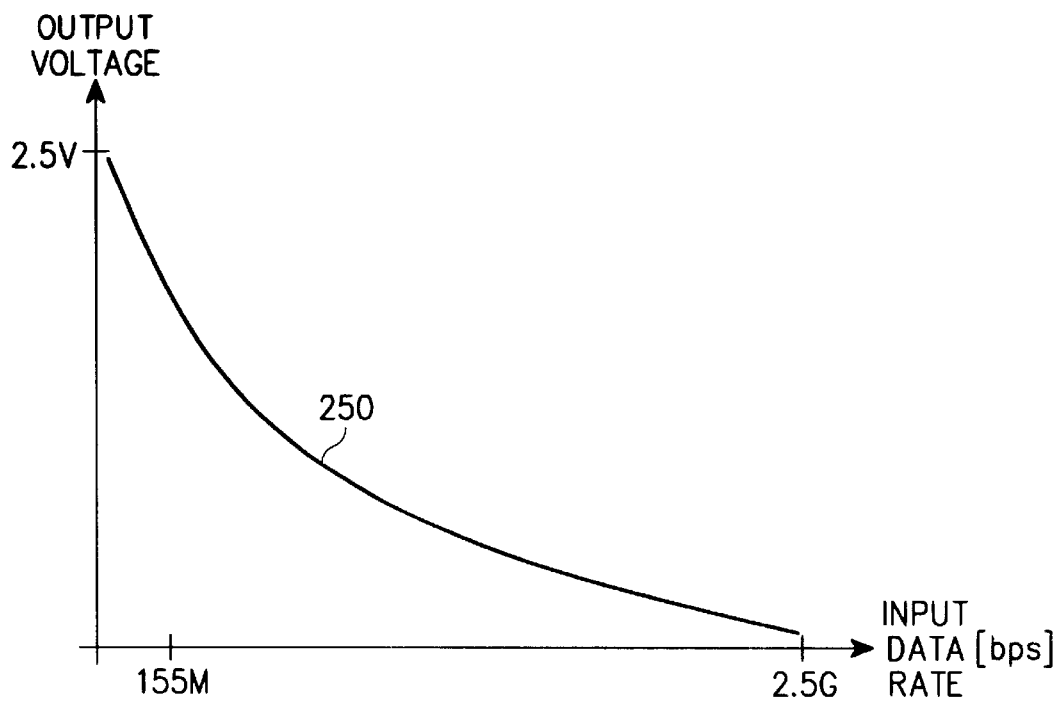
FIG. 6 illustrates the output of an AC power meter in accordance with an embodiment of the present invention.
Figure 7:
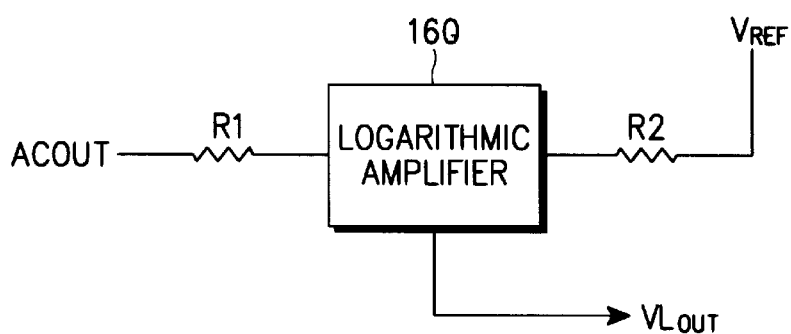
FIG. 7 is a schematic diagram of a logarithmic amplifier in accordance with an embodiment of the present invention.

The values for ACOUT(r) are not linear with respect to the data rates of the input signals, as shown in FIG. 6. A curve 250 represents the output of the AC power meter, ACOUT(r), with respect to the input data rates. The log amplifier 160 receives the output of the AC power meter 160, ACOUT, and linearizes ACOUT with respect to the input data rates. FIG. 7 shows the logarithmic amplifier 160. The logarithmic amplifier 160 receives ACOUT through a resistor R1 and is connected to a reference voltage, $V_{REF}$, through a resistor R2. The output of the logarithmic amplifier, $VL_{OUT}$, is computed as follows:

$VL_{OUT}(r)=K\text{Log}(I1/I2)$ where $I1=\text{ACOUT}(r)/R1$, $I2=V_{REF}/R2$ and K=constant.

Figure 8:
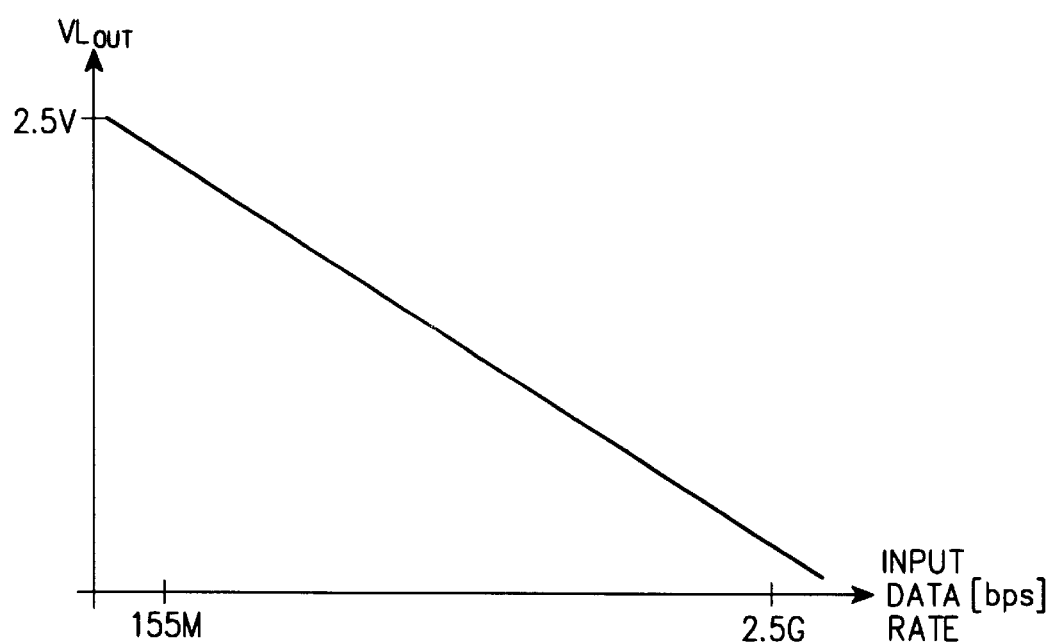
FIG. 8 illustrates the output of the logarithmic amplifier.

By adjusting the values for $V_{REF}$, R1 and R2, the output of the logarithmic amplifier 160, $VL_{OUT}$, can be adjusted. In preferred embodiments of the present invention, the values for $V_{REF}$, R1 and R2 are adjusted such that $VL_{OUT}$ is linear with respect to the data rates of the input signals. FIG. 8 shows $VL_{OUT}$ with respect to the input data rate.

The control circuit 170 receives the output of the log amplifier 160. In preferred embodiments of the present invention, the control circuit 170 may be a microprocessor, a CPU or a controller. The control circuit 170 contains a predetermined data table which lists various values for $VL_{OUT}$ and the corresponding input data rates. Table 2 lists some exemplary values for $VL_{OUT}$ and the corresponding input data rates.

TABLE 2

| Input Data Rate | $VL_{OUT}(r)$ |
|---|---|
| 125 Mbps | 2140 mV |
| 155 Mbps | 1721 mV |
| 200 Mbps | 1411 mV |
| 622 Mbps | 1021 mV |
| 1200 Mbps | 592 mV |
| 2500 Mbps | 152 mV |

The control circuit 170 receives the output of the log amplifier 160 and determines the data rate of the input signal by referencing the predetermined data table since different data rates produce different values for $VL_{OUT}$. For example, as shown in Table 2, if the output of the log amplifier 160 is 2.0 V, then the data rate of the input signal is determined to be 155 Mbps. If the value for $VL_{OUT}$ is not listed in the predetermined table, the corresponding input data rate is calculated by interpolating the data in the predetermined table. After determining the input data rate, the controller 170 adjusts the frequency of the VCO in the CDR 180 to match the input signal data rate by sending a control signal to the VCO to adjust its frequency accordingly. The CDR 180 functions similarly to CDR 30 explained above. Thus, the receiver 100 automatically determines the input signal data rate and automatically adjusts the frequency of the VCO in CDR 180 to match the input signal data rate so that the PLL in CDR 180 will form a lock with the input signal.

Another advantage of the present invention is that the data rate detection and frequency adjustment circuit 200 in accordance with preferred embodiments of the present invention only needs to process low frequency signals because the low pass filter 140 filters out high frequency signals. Therefore, the embodiments of the present invention saves design and fabrication costs for the data rate detection and frequency adjustment circuit 200 because additional circuitry that deals with high frequency signals does not need to be included in the data rate detection and frequency adjustment circuit 200.

In addition, the data rate detection and frequency adjustment circuit 200 reduces the noise present in all frequencies of the input signals, including white and thermal noises, because the low pass filter 140 filters out all frequencies above fcutoff, including the noise present in the frequencies above fcutoff. Thus, the data rate detection and frequency adjustment circuit 200 of the present invention accurately determines the input signal data rate since the low pass filter 140 removes all noises present in the frequencies above fcutoff. The data rate detection and frequency adjustment circuit 200 only needs to deal with the noise present in the frequencies below fcutoff, thereby increasing the accuracy of the data rate detection.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A receiver for processing input data signals in an optical network system, said receiver comprising:
   a photo diode for receiving the input data signals emanating from an optical fiber, each of the input data signals having a data rate;
   an amplifier for amplifying the input data signals to a proper voltage level;
   a clock and data recovery circuit (CDR) for regenerating the input data signals by extracting clock information from the input data signals; and
   a data rate detection circuit for determining the data rate of each of the input data signals by determining a power present in each of the input data signals.

2. The receiver of claim 1, wherein the data rate detection circuit adjusts an output frequency of a phase lock loop in the CDR so that the output frequency approximately matches the determined data rate of each of the input data signals.

3. The receiver of claim 1, wherein the data rate detection circuit comprises:
   a low pass filter for filtering out high frequency components from each of the input data signals and outputting a low frequency components in each of the input data signals.

4. The receiver of claim 3, wherein the data rate detection circuit further comprises:
   an AC power meter for determining the power present in each of the input data signals by calculating the total power present in the low frequency components in each of the input data signals,
   wherein the AC power meter outputs a voltage signal which is a function of the total power present in the low frequency components.

5. The receiver of claim 4, wherein the data rate detection circuit further comprises:
   a control circuit for determining the data rate of each of the input data signals based on the voltage signal outputted by the AC power meter and for outputting a control signal to adjust a frequency of a voltage controlled oscillator in the CDR to approximately match the determined data rate.

6. The receiver of claim 5, wherein the data rate detection circuit further comprises:
   a logarithmic amplifier for linearizing the voltage signals outputted by the AC power meter with respect to the data rates of the input data signals.

7. The receiver of claim 4, wherein the amount of the total power present in the low frequency components is dependent on the data rate of each of the input data signals, and the total power is calculated by the following equation:

$$\text{the total power} = \int_0^{fcutoff} B(f)df$$

where fcutoff=a cutoff frequency of the low pass filter and B(f)=a power spectral density function of the low frequency components of the input signals.

8. The receiver of claim 7, wherein the AC power meter calculates the output voltage signal by calculating a Vrms value representing the total power.

9. The receiver of claim 4, wherein the voltage signal outputted by the AC power meter is inversely proportional to the data rate of each of the input data signals.

10. The receiver of claim 5, wherein the control circuit determines the data rate by comparing the output voltage signal to predetermined voltage signals corresponding to predetermined data rates.

11. A receiver for processing signals in an optical network, said receiver comprising:
   a photo diode for receiving input data signals emanating from an optical fiber, each of the input data signals having a data rate;
   an amplifier for amplifying the input data signals to a proper voltage level;
   a clock and data recovery circuit (CDR) for extracting clock signals from the input data signals and retiming the input data signals based on the extracted clock signals, said CDR including a phase lock loop (PLL) with a voltage controlled oscillator (VCO) for regenerating the extracted clock signals; and
   a data rate detection circuit for determining the data rate of each of the input data signals and adjusting a frequency of the VCO to approximately match the data rate of each of the input data signals.

12. The receiver of claim 11, wherein the data rate detection circuit comprises:
   a low pass filter for receiving the input data signals from the amplifier and filtering out high frequency components from each of the input data signals, said low pass filter outputting low frequency components of each of the input data signals; and
   an AC power meter for calculating total power present in the low frequency components of each of the input data signals and outputting a voltage signal representing the total power.

13. The receiver of claim 12, wherein the data rate detection circuit further comprises:
   a controller for determining the data rate of each of the input data signals based on the voltage signal outputted by the AC power meter and for sending a control signal to change the frequency of the VCO in accordance with the determined data rate, wherein the voltage signal is a function of the data rate of each of the input data signals.

14. The receiver of claim 13, where the data rate detection circuit further comprises:
   a logarithmic amplifier for linearizing the voltage signals outputted by the AC power meter with respect to the data rates of the input data signals and outputting the linearized voltage signals.

15. The receiver of claim 12, wherein the total power is calculated by the following equation:

$$\text{the total power} = \int_0^{fcutoff} B(f) df$$

where fcutoff=a cutoff frequency of the low pass filter and B(f)=a power density function of the low frequency components of the input signals.

16. The receiver of claim 12, wherein the AC power meter calculates the output voltage signal by calculating a Vrms value representing the total power.

17. The receiver of claim 12, wherein the voltage signal outputted by the AC power meter is inversely proportional to the data rate of each of the input data signals.

18. The receiver of claim 14, wherein the controller determines the data rate by comparing the output voltage signal to predetermined voltage signals corresponding to predetermined data rates.

19. The receiver of claim 13, wherein the controller is a microprocessor.

20. The receiver of claim 11, wherein the PLL includes a phase detector and a loop filter.

21. A method of determining a data rate of an input data signal in an optical network system, said method comprising the steps of:
   filtering out high frequency components from the input data signal and outputting low frequency components of the input data signal;
   calculating a power present in the low frequency components of the input data signal; and
   outputting a voltage signal which is a function of the power present in the low frequency components of the input data signal.

22. The method of claim 21, wherein the amount of the power present in the low frequency components is dependent on the data rate of the input data signal.

23. The method of claim 21, further comprising the step of:
   determining the data rate of the input data signal based on the outputted voltage signal,
   wherein the outputted voltage signal is a function of the data rate of the input data signal.

24. The method of claim 23, further comprising the step of:
   linearizing the outputted voltage signal with respect to the data rate of the input data signal.

25. The method of claim 24, wherein the data rate of the input data signal is determined by comparing the linearized output voltage signal to predetermined voltage signals corresponding to predetermined data rates.

26. The method of claim 25, further comprising the step of:
   outputting a control signal to adjust a frequency of a voltage controlled oscillator based on the determined data rate.

27. A data rate detection circuit for determining a data rate of an input data signal, said data rate detection circuit comprising:
   a low pass filter for filtering out high frequency components from the input data signal and outputting a low frequency components in the input data signal; and
   an AC power meter for determining a power present the low frequency components of the input data signal and for outputting a voltage signal which is a function of the power present in the low frequency components of the input data signal,
   wherein the amount of the power present in the low frequency components is dependent on the data rate of the input data signal.

28. The data rate detection circuit of claim 27, further comprising:
   a control circuit for determining the data rate of the input data signal based on the voltage signal outputted by the AC power meter.

29. The data rate detection circuit of claim 28, further comprising:
   a logarithmic amplifier for linearizing the voltage signal outputted by the AC power meter with respect to the data rate of the input data signal.

30. The data rate detection circuit of claim 29, wherein the control circuit determines the data rate by comparing the output voltage signal to predetermined voltage signals corresponding to predetermined data rates.

31. The data rate detection circuit of claim 27, wherein the voltage signal outputted by the AC power meter is inversely proportional to the data rate of the input data signal.

* * * * *